(12) United States Patent
Mahood

(10) Patent No.: US 7,498,397 B2
(45) Date of Patent: Mar. 3, 2009

(54) COPOLYCARBONATES, METHODS OF MANUFACTURE, AND USES THEREOF

(75) Inventor: James A. Mahood, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 267 days.

(21) Appl. No.: 11/372,804

(22) Filed: Mar. 10, 2006

(65) Prior Publication Data

US 2007/0213498 A1 Sep. 13, 2007

(51) Int. Cl.
*C08G 63/04* (2006.01)
*C08G 64/00* (2006.01)

(52) U.S. Cl. .................. 528/196; 528/198; 528/199
(58) Field of Classification Search .......... 528/196, 528/198, 199
See application file for complete search history.

(56) References Cited

U.S. PATENT DOCUMENTS

| | | | |
|---|---|---|---|
| 4,605,731 A | 8/1986 | Evans et al. | |
| 4,740,583 A | 4/1988 | Brunelle et al. | |
| 4,760,117 A * | 7/1988 | Evans et al. | 525/394 |
| 4,920,200 A | 4/1990 | Brunelle et al. | 528/370 |
| 4,921,975 A | 5/1990 | Shannon et al. | 549/228 |
| 4,994,547 A | 2/1991 | Brunelle et al. | 528/201 |
| 5,153,276 A | 10/1992 | Krabbenhoft et al. | 525/462 |
| 5,162,458 A | 11/1992 | Krabbenhoft et al. | 525/462 |
| 5,162,459 A | 11/1992 | Krabbenhoft et al. | 525/462 |
| 5,324,809 A | 6/1994 | Sakashita et al. | 528/198 |
| 5,418,315 A | 5/1995 | Sakashita et al. | 528/196 |
| 5,484,875 A | 1/1996 | Sakashita et al. | 528/198 |
| 5,717,056 A | 2/1998 | Varadarajan et al. | 528/196 |

FOREIGN PATENT DOCUMENTS

| | | |
|---|---|---|
| EP | 0012203 | 5/1983 |
| EP | 0375935 | 7/1990 |
| EP | 0375936 | 7/1990 |
| EP | 0520804 | 12/1992 |

OTHER PUBLICATIONS

Deits, et al., Functional Polymers. IX. Polycarbonates and Alternating Copolycarbonates of Bithionol, Journal of Polymer Science: Polymer Chemistry Edition, 1981, p. 403-425, vol. 19.
Pilati, et al., Sulfur-Containing Polymers: Thermal Behavior of Copolymers Containing Thiocarbonate Groups, Polymer Degradation and Stability, 1987, pp. 63-72, vol. 18.
Sweileh, et al. Synthesis and Thermal Properties of Polycarbonates Based on Bisphenol A by Single-phase Organic Solvent Polymerization, Journal of Polymer Research, 2006, pp. 181-191, vol. 13.

International Search Report for International Application No. PCT/US2007/003888, mailed Oct. 9, 2007, 6 pages.
Written Opinion for International Search Report for International Application No. PCT/US2007/003888, mailed Oct. 9, 2007, 7 pages.
Japanese Patent No. JP 05339390, published Dec. 21, 1993, abstract only.
Japanese Patent No. JP59047228 published Mar. 16, 1984, abstract only.
Japanese Patent No. JP52109591 published Sep. 13, 1977, abstract only.

* cited by examiner

*Primary Examiner*—Terressa M Boykin

(57) ABSTRACT

A copolycarbonate of the formula

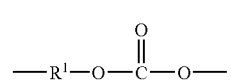

(1)

wherein 5 to 50 mole percent of the total number of $R^1$ groups is derived from a monomer of formula (2)

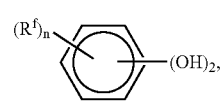

(2)

wherein each $R^f$ is independently at each occurrence a halogen atom, a hydrocarbon group having 1 to 10 carbons, or a halogen substituted hydrocarbon group having 1 to 10 carbons, and n is 0 to 4; and 50 to 95 mole percent of the $R^1$ groups are derived from a dihydroxy compound of formula $HO-R^5-OH$, wherein at least 60% of the $R^5$ groups are aromatic, and the dihydroxy compound of formula (3) is not a compound of formula (2), and wherein the copolycarbonate comprises at least 10% fewer carbonate linkages of formula (4)

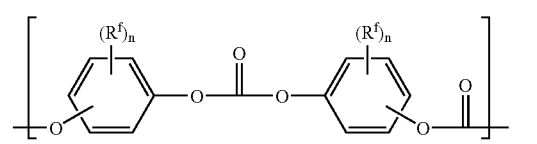

(4)

than would be theoretically obtained in a random copolymer made from the same ratio of the monomer of formula (2) and the dihydroxy compound of formula (3).

20 Claims, No Drawings

COPOLYCARBONATES, METHODS OF MANUFACTURE, AND USES THEREOF

BACKGROUND OF THE INVENTION

This disclosure relates to copolycarbonate compositions, and in particular to copolycarbonate compositions having improved properties, methods of manufacture, and uses thereof.

Polycarbonate and copolycarbonates are useful in the manufacture of articles and components for a wide variety of applications from automotive parts to electronic appliances. Some polycarbonates and copolycarbonates demonstrate excellent mechanical properties, heat resistance, transparency, and chemical resistance. However, optical clarity can be difficult to achieve, particularly in some copolycarbonates.

SUMMARY OF THE INVENTION

The above-described and other deficiencies of the art are addressed by a copolycarbonate of the formula

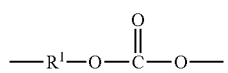
(1)

wherein
5 to 50 mole percent of the total number of $R^1$ groups is derived from a monomer of formula (2)

(2)

wherein each $R^f$ is independently at each occurrence a halogen atom, a hydrocarbon group having 1 to 10 carbons, or a halogen substituted hydrocarbon group having 1 to 10 carbons, and n is 0 to 4; and 50 to 95 mole percent of the $R^1$ groups are derived from a dihydroxy compound of formula (3)

$$HO—R^5—OH \quad (3),$$

wherein at least 60% of the $R^5$ groups are aromatic, and the dihydroxy compound of formula (3) is not a compound of formula (2), and wherein the copolycarbonate comprises at least 10% fewer carbonate linkages of formula (4)

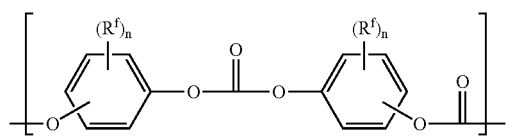
(4)

than would be theoretically obtained in a random copolymer made from the same ratio of the monomer of formula (2) and the dihydroxy compound of formula (3).

In another embodiment, a method of preparing the above-described copolycarbonate comprises reacting a monomer of formula (2) with a bischloroformate formed from a dihydroxy compound of formula (3), in a reaction system comprising water, a substantially inert, substantially water-insoluble organic liquid, base and a phase transfer agent to form a condensate, wherein the degree of polymerization of the bischloroformate is adjusted to minimize the linkages of formula (4); and contacting the condensate with an organic base to hydrolyze and condense residual bischloroformates in the condensate.

In yet another embodiment, an article comprises the above-described copolycarbonate.

In still another embodiment, a method of manufacture of an article comprises forming the above-described copolycarbonate into an article.

DETAILED DESCRIPTION OF THE INVENTION

It has been discovered that copolycarbonates formed from monomers of formula (2) and dihydroxy compounds of formula (3) and having transparency and optical clarity can unexpectedly be obtained by decreasing the number of monomer of formula (2)-monomer of formula (2) carbonate linkages (carbonate linkages of formula (4) in the copolycarbonate. For example, where the monomer of formula (2) used to make the copolycarbonate is hydroquinone, minimizing the number of hydroquinone-hydroquinone carbonate linkages improves the optical clarity of the copolycarbonate. Prior art disclosures relating to hydroquinone-type copolycarbonates have apparently been directed to the formation of random copolycarbonates, and therefore have failed to recognize the advantage of minimizing hydroquinone-hydroquinone carbonate linkages.

As used herein, the term "copolycarbonate" and "copolycarbonate resin" means polymers comprising repeating structural carbonate units of the formula (1)

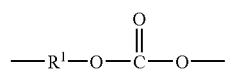
(1)

in which a portion of the $R^1$ groups are derived from an aromatic dihydroxy compound having the structure of formula (2)

(2)

wherein each $R^f$ is independently at each occurrence a halogen atom, a hydrocarbon group having 1 to 10 carbons, or a halogen substituted hydrocarbon group having 1 to 10 carbons, and n is 0 to 4. The halogen is usually bromine. Examples of such compounds include resorcinol, substituted resorcinol compounds, catechol, substituted catechol compounds, hydroquinone, and substituted hydroquinone compounds. Exemplary substituted resorcinol compounds include, but are not limited to, 4-bromoresorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol. Exemplary substituted hydroquinone compounds include, but are not limited to, 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone.

In addition, a portion of the $R^1$ groups is derived from a different dihydroxy compound, represented by the formula HO—$R^5$—OH, wherein $R^5$ is a divalent $C_{1-30}$ hydrocarbyl group, that is, a group containing carbon, hydrogen, and optionally one or more other heteroatoms such as oxygen, nitrogen, sulfur, or a halide, provided that at least 60% of the $R^5$ groups are aromatic. Exemplary hydrocarbyl groups include substituted and unsubstituted $C_{1-30}$ alkylene groups, substituted and unsubstituted $C_{3-30}$ cycloalkylene groups, and substituted and unsubstituted $C_{6-30}$ arylene groups. The compound of the formula HO—$R^5$—OH is not a compound of formula (2). Stated another way, the compounds of formula HO—$R^5$—OH are specifically defined as excluding the compounds described by formula (2).

For example, the $R^5$ groups can have the structure of formula (5)

-$A^1$-$Y^1$-$A^2$-      (5)

wherein each of $A^1$ and $A^2$ is independently a monocyclic divalent aryl radical, and $Y^1$ is —O—, —S—, —S(O)—, —S(O$_2$)—, —C(O)—, or a divalent, substituted or unsubstituted $C_{1-30}$ hydrocarbon. The carbonate units containing the residues of formula (5) may be produced by the reaction of dihydroxy compounds of formula (6)

HO-$A^1$-$Y^1$-$A^2$-OH      (6)

wherein $Y^1$, $A^1$ and $A^2$ are as described above. Included are bisphenol compounds of general formula (7)

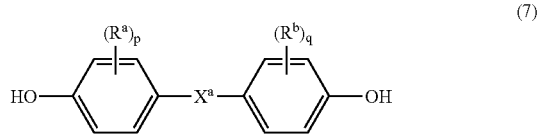

(7)

wherein $R^a$ and $R^b$ are each independently a halogen atom or a monovalent $C_{1-6}$ alkyl group; p and q are each independently integers of 0 to 4; and $X^a$ is a hydrocarbylene wherein one to four carbon atom separate the two phenyl rings. In one embodiment, $X^a$ represents one of the following groups:

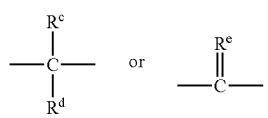

wherein $R^{c \, and \, Rd}$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group. Exemplary $X^a$ groups are methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. A specific class of alkyl-substituted cyclohexylidenes may be derived from bisphenols of formula (8)

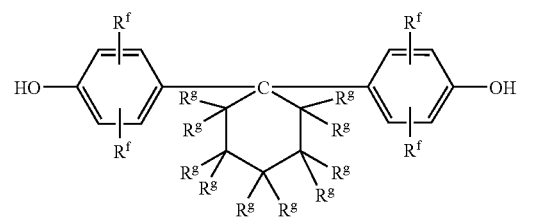

(8)

wherein each $R^f$ is independently hydrogen, $C_{1-12}$ alkyl, or halogen; and each $R^g$ is independently hydrogen or $C_{1-12}$ alkyl. Such cyclohexane-containing bisphenols, for example the reaction product of two moles of a phenol with one mole of a hydrogenated isophorone, are useful for making polycarbonate polymers with high glass transition temperatures and high heat distortion temperatures.

Additional illustrative, non-limiting examples of suitable bisphenols include the following: bis(4-hydroxyphenyl) methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, 2,2-bis(4-hydroxy-3-bromophenyl)propane, 1,1-bis(hydroxyphenyl)cyclopentane, 1,1-bis(4-hydroxyphenyl) cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl) adamantine, (alpha, alpha'-bis(4-hydroxyphenyl)toluene, bis (4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2butanone, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), and the like, as well as combinations comprising at least one of the foregoing dihydroxy compounds.

Specific examples of bisphenol compounds that may be represented by formula (5) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, and 1,1-bis (4-hydroxy-3-methylphenyl)cyclohexane (DMBPC). Combinations comprising at least one of the foregoing dihydroxy compounds can also be used.

In the alternative, or in addition, $R^1$ can be derived from arylene-containing compounds such as 4,4'-dihydroxybiphenyl, 1,6-dihydroxynaphthalene, and 2,6-dihydroxynaphthalene.

In one embodiment 5 to 50 mole % of the $R^1$ groups in the copolycarbonate are derived from a monomer of formula (2), and 50 to 95 mole % of the $R^1$ groups are derived from another dihydroxy compound of formula (3). In another embodiment, 10 to 40 mole % of the $R^1$ groups in the copolycarbonate are derived from a monomer of formula (2), and 60 to 90 mole % of the $R^1$ groups are derived from another dihydroxy compound of formula (3). In still another embodiment, 20 to 35 mole % of the $R^1$ groups in the copolycarbonate are derived from a monomer of formula (2), and 65 to 80 mole % of the $R^1$ units are derived from another dihydroxy compound of formula (3). In still another embodiment, 25 to 30 mole % of the $R^1$ groups in the copolycarbonate are derived from a monomer of formula (2), and 70 to 75 mole % of the $R^1$ units are derived from another dihydroxy compound of formula (3).

In one embodiment, the sum of the mole % of the units derived from a monomer of formula (2) and the mole % of the units derived from the dihydroxy compound of formula (3) is 100%.

As described in the prior art, copolycarbonates can be produced using standard processes, including interfacial phosgenation, and one-step and two-step processes based on bischloroformates. In interfacial processes, dihydroxy reactant(s) are dissolved or dispersed in aqueous caustic soda (sodium hydroxide) or potash, and the resulting mixture added to a suitable water-immiscible solvent medium. The reactants are then contacted with a carbonate precursor in the presence of a catalyst such as triethylamine or a phase transfer catalyst, under controlled pH conditions, e.g., about 8 to about 10. Such processes have been found to produce copolycarbonates having a high number of monomer of formula (2)-monomer of formula (2) carbonate linkages. Copolycarbonates having a high number of these types linkages spontaneously precipitate out of solution. It has unexpectedly been found that the number of monomer of formula (2)-monomer of formula (2) carbonate linkages in the product copolycarbonate are decreased by use of a modified two-step bischloroformate process, wherein the oligomer block length is minimized. Without intentionally minimizing oligomer block length, the two-step bischloroformate process can actually generate a blocky structure with more undesirable carbonate linkages than a random copolymer.

In the two-step bischloroformate process, an aromatic bischloroformate composition is first formed from the dihydroxy compound(s) of formula (3), e.g., BPA with or without another dihydroxy compound other than a monomer of formula (2). Such bischloroformates are of the formula (10)

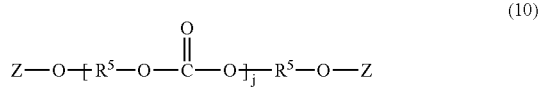
(10)

wherein $R^5$ is as defined above, j is 0 to 19, and Z is H, an alkaline metal or alkaline earth metal cation used in the formation of the bischloroformate, or a chloroformate group (—C(O)Cl), provided that at least one Z is a chloroformate group. In one embodiment, the majority of the Z groups are chloroformate groups. Even more specifically, greater than 75% of the Z groups are chloroformate groups.

The bischloroformate of formula (10) is formed by contacting the dihydroxy compound(s) in a substantially inert, substantially water-immiscible solvent with an aqueous alkali or alkaline earth metal solution and phosgene.

Illustrative solvents are aliphatic hydrocarbons such as hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; and substituted aromatic hydrocarbons such as chlorobenzene, o-dichlorobenzene, the chlorotoluenes, nitrobenzene and acetophenone. The most commonly used water-immiscible solvents include methylene chloride, 1,2-dichloroethane, chlorobenzene, toluene, and the like.

The aqueous alkali solution is an aqueous solution of a strongly basic hydroxide such as sodium hydroxide or potassium hydroxide. The concentration of the basic hydroxide in the aqueous alkali solution can be 1 to 50% by weight, specifically 30 to 50% by weight. The amount of the basic hydroxide is in slight excess of 2 moles, for example 2.01 to 2.5 moles per mole of the dihydroxy compound(s).

As mentioned above, it has been found that decreasing the number of monomer of formula (2)-monomer of formula (2) linkages in copolycarbonates is achieved both by using a two-step bischloroformate process and minimizing the degree of polymerization of the intermediate bischloroformates of structure 10. Minimizing the degree of polymerization can be achieved by adjusting the reaction conditions used to form and react the bischloroformates. For example, a low solution pH can be used during bischloroformate formation, which is theorized to minimize reaction between the bischloroformate and the hydroxide ions in aqueous phase. Low concentrations of dihydroxy compound can be used, which is theorized to decrease or prevent condensation of the dihydroxy compound with the bischloroformate in the organic phase. This can be accomplished by cofeeding a dihydroxy compound solution to the reactor during phosgenation at a rate to minimize accumulation of the dihydroxy compound, for example at a rate which is lower than or equal to the molar phosgene feed rate. High phosgenation rates can be used, to maintain the concentration of phosgene in the reaction mixture as high as practically possible. In one embodiment, all three of a low pH, low dihydroxy compound concentration, and high phosgenation rate are used.

Using the above guidance, precise bischloroformate formation conditions can be readily determined by one of ordinary skill in the art without undue experimentation. For example, the bischloroformate of formula (10) can be formed at temperatures of 0° to 50° C. and pH values of the aqueous phase of 2 to 6. Time periods may be from a few seconds to 20 minutes or more; longer time periods ordinarily provide no discernible advantage.

In general, where more of a monomer of formula (2) is to be incorporated into the copolycarbonate, the desired degree of polymerization of the bischloroformate oligomer is lower. For example, to produce a copolycarbonate containing 20 mole % of a monomer of formula (2), the bischloroformate of formula (10) is ideally a four-mer or smaller (j=1-3). To produce a copolycarbonate containing 25 mole % of a monomer of formula (2), use of a bischloroformate of formula (10) of three units or less will minimize formation of monomer of formula (2)-monomer of formula (2) carbonate linkages. To produce a copolycarbonate containing 33 mole % of a monomer of formula (2), use of a bischloroformate of formula (10) of two units or less will minimize formation of monomer of formula (2)-monomer of formula (2) carbonate linkages. The average number of units in the bischloroformate is thus 1 to 19, more specifically 1 to 14, 1 to 10, 1 to 7, or 1 to 5, even more specifically 1 to 4 or 1 to 3, or even more specifically 1 to 2, depending on the amount of monomer of formula (2) to be incorporated into the copolycarbonate.

By forming the bischloroformate first and then reacting the bischloroformate with the monomer of formula (2) two objectives are achieved. Monomers of formula (2) are exposed to little or no phosgene, limiting the opportunity for the formation of oligomers consisting of structural units derived from monomers of formula (2). Oligomers consisting of structural units derived from monomers of formula (2) precipitate easily from the aqueous phase of the biphasic system. Additionally, by forming the bischloroformate first, the number of repeating units in the bischloroformate can be controlled. The number of repeating units in the bischloroformate has an impact on the reactivity and final physical properties of the copolycarbonate.

After formation of the bischloroformate, the bischloroformate is contacted with a monomer of formula (2), a base such as sodium hydroxide or potassium hydroxide, and a phase transfer agent to induce condensation. The order of addition does not appear to be particularly important. The amount of monomer of formula (2) will vary depending on the desired final molar ratio of the monomer of formula (2) in the copolymer.

Among the phase transfer catalysts that may be used are catalysts of the formula $(R^9)_4Q^+X$, wherein each $R^9$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. In a specific embodiment X is Cl$^-$halogen such as chloride or a hydroxyl group. An effective amount of phase transfer catalyst is generally 0.1 to 10 wt. %, based on the weight of monomer of formula (2) in the phosgenation mixture. In another embodiment an effective amount of phase transfer catalyst is 0.5 to 2 wt. % based on the weight of monomer of formula (2) in the phosgenation mixture.

In general, the copolycarbonate formation reaction is conducted at 0 to 100° C., specifically 20 to 50° C.; at a pH in excess of about 7, particularly 8 to 10; and using 0.235 to 3.0 mole percent catalyst, based on structural units in the bischloroformate composition.

A capping agent (also referred to as a chain stopper in the art) is used during bischloroformate formation or during the condensation step to limit polymer molecular weight. Exemplary capping agents include certain mono-phenolic compounds, mono-carboxylic acid chlorides, and/or mono-chloroformates. Suitable mono-phenolic chain stoppers are exemplified by monocyclic phenols such as phenol and $C_1$-$C_{22}$ alkyl-substituted phenols such as p-cumyl-phenol, resorcinol monobenzoate, and p-and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. The proportion of capping agent with respect to bischloroformate will depend on the desired molecular weight and/or intrinsic viscosity of the linear copolycarbonate product. Amounts of about 0.5 to 7.0 mole percent, based on structural units in the bischloroformate composition, are typical.

Branched copolycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05 to 2.0 wt. %. Mixtures comprising linear copolycarbonates and branched copolycarbonates may be used.

After condensation has proceeded to the desired degree of completeness, as determined by the amount of unreacted monomer of formula (2), an organic base is added to hydrolyze and condense any residual bischloroformates, and is preferred where excess bischloroformates have been used. Suitable bases include tertiary amines used for interfacial polymerization of copolycarbonates. Exemplary tertiary amines include aliphatic amines such as triethylamine, tri-n-propylamine, diethyl-n-propylamine, and tri-n-butylamine and highly nucleophilic heterocyclic amines such as 4-dimethylaminopyridine. The exemplary amines dissolve preferentially in the organic phase of the reaction system to increase contact between the amine and bischloroformate composition. The most useful amines are trialkylamines containing no branching on the carbon atoms in the 1- and 2-positions, particularly are tri-n-alkylamines in which the alkyl groups contain up to about 4 carbon atoms.

The mixture may then be contacted with additional phosgene to ensure complete polymerization. It is generally desirable that the concentration of monomer of formula (2) be extremely low before the addition of phosgene. In one embodiment, the concentration of monomer of formula (2) is less than or equal to 200 parts per million (ppm), or more specifically, less than or equal to 100 ppm, as determined by, for example, spectrometry using the ultraviolet (UV)/visible (Vis) absorbance of the monomer of formula (2) such as hydroquinone prior to the addition of phosgene.

Either batch or continuous conditions may be used for the production of the copolycarbonates, or one step may be conducted batchwise and the other continuously.

The copolycarbonates can be isolated from the reaction mixture, or used as produced to form articles. For example steam precipitation can be used, or anti-solvent precipitation (using methanol, for example). Alternatively, an article such as a film can be formed directly from the reaction solution (by solvent casting, e.g.) without intermediate isolation of the copolycarbonate.

The process described herein provides a method for decreasing the number of monomer of formula (2)-monomer of formula (2) carbonate linkages in a copolycarbonate. More specifically, disclosed herein is a method for the manufacture of copolycarbonates having fewer monomer of formula (2)-monomer of formula (2) carbonate linkages of formula (4)

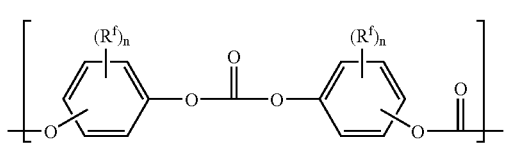

than would be obtained in a random copolymer made from the same ratio of the monomer of formula (2) and the dihydroxy compound of formula (3). The number of monomer of formula (2)-monomer of formula (2) carbonate linkages in the copolycarbonate can be quantified on a percent basis by $^{13}$C NMR, using the areas under the curve for each type of carbonate linkage present in the polymer.

In general, the number of monomer of formula (2)-monomer of formula (2) carbonate linkages formed in the copolycarbonates will be correlate with the mole % of the monomer of formula (2) used to form the copolycarbonate: the higher the mole % of monomer of formula (2) used to form the copolycarbonate, the higher the number of monomer of formula (2)-monomer of formula (2) linkages that will be formed. For example, in a random AB copolycarbonate comprising 40 mole % A units and 60 mole % B units, the theoretical concentration of A-A carbonate linkages is 16% ($[0.40]^2*100$), the theoretical concentration of B-B carbonate linkages is 36% ($[0.60]^2*100$), and the theoretical concentration of A-B carbonate linkages is 48% (100%-16%-48%). Similarly, in a random AB copolycarbonate comprising 25 mole % A units and 75 mole % B units, the theoretical concentration of A-A carbonate linkages is 6.25%, the theoretical concentration of B-B carbonate linkages is 56.25%, and the theoretical concentration of A-B carbonate linkages is 37.5%.

Copolycarbonates manufacture in accordance with the method described herein have fewer than the number carbonate linkages of formula (4) than would be theoretically formed in a random copolymer made using the same ratio of the monomer of formula (2) and the dihydroxy compound of formula (3). In one embodiment, at least 10% fewer linkages of formula (4) are formed. Up to 100% fewer linkages can theoretically be formed, i.e., no linkages of formula (4) are present in the copolymer. In other embodiments, 10% to 99%, 15% to 95%, 20 to 90%, 25 to 85%, 30 to 80%, 40 to 75%, or 50 to 70% fewer linkages of formula (4) are formed than the theoretical number that would be formed in a random copolymer made using the same ratio of the monomer of formula (2) and the dihydroxy compound of formula (3).

The weight average molecular weight of the polycarbonates is 17,000 to 100,000 daltons, measured using gel permeation chromatography (GPC) with polycarbonate standards. In one embodiment, the molecular weight is 20,000 to 29,000 daltons.

The copolycarbonates are manufactured to have a high optical clarity. Thus, the transmissivity of the copolycarbonates can be greater than 50%, greater than 60%, greater than 70%, greater than 80%, or greater than 90%, measured using 2.5 mm plaques according to ASTM-D1003-00.

The amount and type of other polymers and/or additives used with the copolycarbonates are selected so as to provide the desired properties to the copolycarbonate without substantially adversely impacting other properties required for a given application. Such selections may be made without undue experimentation by one of ordinary skill in the art, based on the desired properties of the composition and the known properties of the additives. For example, use of certain polymers and/or additives can be limited by the processing conditions used for the copolycarbonates. In one embodiment described below, films comprising the copolycarbonates are formed by solution casting. Other polymers and/or additives (for example, impact modifiers, UV stabilizers, and the like), will preferably also be soluble in the solution used to cast the film. The amount and type of other polymers and/or additives used with the copolycarbonate may also be limited by the intended application. For example, where a transparent film is desired, it may not be possible to use certain impact modifiers, fillers, colorants, or anti-drip agents.

The copolycarbonates described herein can be used in combination with other polymers, including other homopolycarbonates, polycarbonate copolymers comprising different $R^1$ groups, and/or copolymers comprising polycarbonate units and other polymer units such as ester units or diorganosiloxane units. As used herein, a "combination" is inclusive of blends, mixtures, alloys, and the like. The copolycarbonates can also be used in combination with other polymers, for example polyesters such as polyarylates, polyacetals, polystyrenes, polyamides, polyamideimides, polyimides, polyetherimides, polysulfones such as polyarylsulfones and polyethersulfones, polysulfonates, polysulfonamides, polysulfides such as polyphenylene sulfides, polythioesters, polytetrafluoroethylenes, polyetherketones, polyether etherketones, polyether ketone ketones, polyvinyl ethers, polyvinyl thioethers, polyvinyl, polyvinyl ketones, polyvinyl halides alcohols such as polyvinyl chlorides, polyvinyl nitriles, polyvinyl esters, or a combination comprising at least one of the foregoing organic polymers.

The copolycarbonates may further be combined with an impact modifier composition, to increase impact resistance. These impact modifiers include elastomer-modified graft copolymers comprising (i) an elastomeric (i.e., rubbery) polymer substrate having a Tg less than about 10° C., more specifically less than about −10° C., or more specifically about −400 to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (11)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (12)

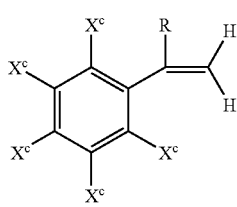

(12)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (13)

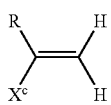

(13)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (13) include acrylonitrile, ethacrylonitrile, methacrylonitrile, alpha-chloroacrylonitrile, beta-chloroacrylonitrile, alpha-bromoacrylonitrile, acrylic acid, methyl (meth) acrylate, ethyl (meth)acrylate, n-butyl (meth)acrylate, t-butyl (meth)acrylate, n-propyl (meth)acrylate, isopropyl (meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and th like, and combinations comprising at least one of the foregoing monomers. The $C_{1-8}$ alkyl (meth)acrylate monomers may optionally be polymerized in admixture with up to 15 wt. % of comonomers of formulas (11), (12), or (13). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and in one embodiment has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (12) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (13). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (12) or (13), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

A specific impact modifier is a methyl methacrylate-butadiene-styrene (MBS) impact modifier. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). When present, impact modifiers can be present in the thermoplastic composition in amounts of 0.1 to 30 percent by weight, based on the total weight of the polycarbonate and sulfonated polyarylate polymer.

Various additives ordinarily incorporated into the copolymer resin compositions, with the proviso that the additives are preferably selected so as to not significantly adversely affect the desired properties of the copolycarbonates. Mixtures of additives may be used. Such additives may be mixed at a suitable time during the mixing of the components for forming the composition.

When the copolycarbonates are used to form films, and particularly transparent film, type of filler and particle size are selected so as to not significantly adversely affect the smoothness or desired level of transparency. Fillers that are non-aggregating in the casting solution are particularly useful.

Suitable fillers or reinforcing agents may include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 500 parts by weight, based on 100 parts by weight of the copolycarbonate resin.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 1 to about 10 parts by weight, based on 100 parts by weight of the copolycarbonate resin.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 1 to about 10 parts by weight, based on 100 parts by weight of the copolycarbonate resin.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 1 to about 10 parts by weight, based on 100 parts by weight of the copolycarbonate resin.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 1 to about 10 parts by weight, based on 100 parts by weight of the copolycarbonate resin.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 1 to about 25 parts by weight, based on 100 parts by weight of the copolycarbonate resin.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 1 to about 25 parts by weight, based on 100 parts by weight of the copolycarbonate resin.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 1 to about 25 parts by weight, based on 100 parts by weight of the copolycarbonate resin.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti- stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 1 to about 25 parts by weight, based on 100 parts by weight of copolycarbonate resin and any impact modifier.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

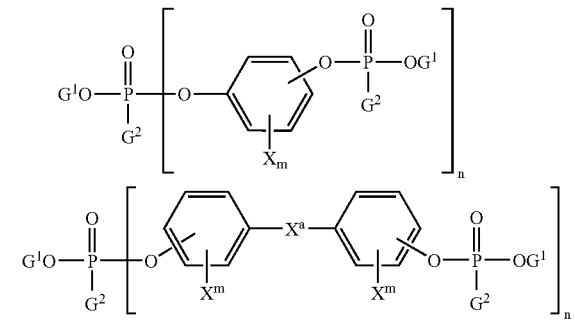

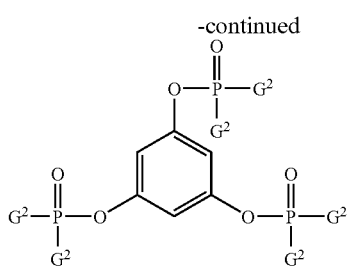

-continued wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the copolycarbonate resin.

Halogenated materials may also be used as flame retardants, for example halogenated compounds and resins of formula (14)

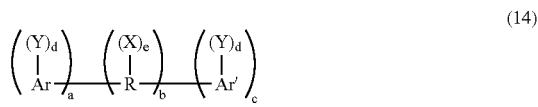

(14)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (14) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one or, more specifically, two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 1 to about 25 parts by weight, based on 100 parts by weight of the copolycarbonate resin.

Alternatively, the thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of copolycarbonate.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 1 to about 20 parts by weight, based on 100 parts by weight of the copolycarbonate resin.

Another useful type of flame retardant is a polysiloxane-polycarbonate copolymer having polydiorganosiloxane blocks comprise repeating structural units of formula (15)

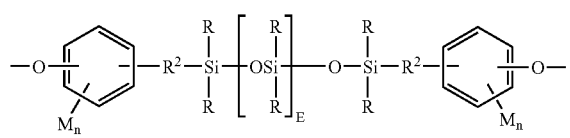

(15)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. $R^2$ in formula (15) is a divalent $C_{1-8}$ aliphatic group. Each M in formula (15) may be the same or different, and may be a halogen, cyano, nitro, $C_{1-8}$ alkylthio, $C_{1-8}$ alkyl, $C_{1-8}$ alkoxy, $C_2$-$C_8$ alkenyl, $C_2$-$C8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

E in formula (15) is selected so as to provide an effective level of flame retardance to the thermoplastic composition. The value of E will therefore vary depending on the type and relative amount of each component in the thermoplastic composition, including the type and amount of copolycarbonate, impact modifier, polysiloxane-polycarbonate copolymer, and other flame retardants. Suitable values for E may be determined by one of ordinary skill in the art without undue experimentation using the guidelines taught herein. Generally, E has an average value of 2 to about 1000, specifically about 10 to about 100, more specifically about 25 to about 75. In one embodiment, E has an average value of about 40 to about 60, and in still another embodiment, E has an average value of about 50. Where E is of a lower value, e.g., less than about 40, it may be necessary to use a relatively larger amount of the polysiloxane-polycarbonate copolymer. Conversely, where E is of a higher value, e.g., greater than about 40, it may be necessary to use a relatively smaller amount of the polysiloxane-polycarbonate copolymer.

In one embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming copolycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of copolycarbonate.

Anti-drip agents may also be used in the composition, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of 0.1 to 5 percent by weight, based on 100 parts by weight of the polycarbonate resin.

Radiation stabilizers may also be present, specifically gamma-radiation stabilizers. Suitable gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon may be a methylol group (—CH$_2$OH) or it may be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.001 to 1 wt %, more specifically 0.01 to 0.5 wt %, based on 100 parts by weight of the copolycarbonate resin.

Thermoplastic compositions comprising the copolycarbonate resin and one or more of the optional other polymer(s), optional filler(s), and optional additive(s) foregoing may be manufactured by methods generally available in the art, for example, in one embodiment, in one manner of proceeding, powdered copolycarbonate resin and/or other optional components are first blended, optionally with fillers in a HENSCHEL-Mixer® high speed mixer. Other low shear processes, including but not limited to hand mixing, may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the copolycarbonate compositions are also provided. The copolycarbonate compositions may be molded into useful shaped articles by different means such as injection molding, extrusion, rotational molding, blow molding and thermoforming to form articles for a wide variety of applications such as, for example, packaging, housings for electronic equipment such as computers (e.g., monitors), handheld electronic devices, cell phones, and electrical connectors, and components of lighting fixtures, ornaments, home appliances, roofs, greenhouses, sun rooms, swimming pool enclosures, and the like.

If used, the temperature of the blending, extruding, and/or shaping are carefully controlled so as to minimize or eliminate degradation of the copolycarbonates. Alternatively, the resins may first be dissolved in a solvent, and then mixed with other additives. In one embodiment, the copolycarbonate solution as produced is mixed with any other additives. The solvent can then be removed, and the composition shaped into articles as describe above. Again, however, it is more convenient to form the article from a solution of the composition, for example by spin coating, casting, dipping, bar coating, roll coating, or the like.

For example, in one embodiment the copolycarbonate compositions are formed into films, particularly transparent films, for high performance applications. The films can be formed by methods known in the art, for example spin coating, casting, dipping, bar coating, or roll coating a solution of the copolycarbonate dissolved in a solvent, together with any optional additives. In an exemplary process, the copolycarbonate resin is dissolved in an organic solvent such as dichloromethane to an appropriate concentration, for example 5 to 50% by weight of resin, together with any optional additives. Suitable solvents and concentrations are readily determined by one of ordinary skill in the art, depending on the solubility of the copolycarbonate, the molecular weight of the copolycarbonate, the type and presence of any additives, and like considerations. The solution as produced in the manufacturing process, i.e., without any intermediate isolation of the copolycarbonate, can also be used.

This solution is formed into a film having an appropriate thickness, for example by casting or spin coating onto a substrate or a release sheet. The film is dried at a temperature effective to remove the solvent without significantly adversely affecting the physical properties if the film. The temperature at which the solvent is evaporated will vary depending on the particular resin composition and solvent used. Suitable temperatures can be, for example 20° C. to 200° C., specifically 30° C. to 150° C., still more specifically 40° C. to 100° C. The thickness of the film after solvent removal will depend on the intended application, but can be, for example, 1 micrometer to 200 micrometers, specifically 10 micrometers to 150 micrometers, more specifically 20 micrometers to 100 micrometers.

The copolycarbonate compositions are further illustrated by the following non-limiting examples.

EXAMPLE 1

The following procedure can be used to form copolycarbonates with a decreased number of monomer of formula (2)-monomer of formula (2) carbonate linkages.

To a 2-liter (L) flask equipped with mechanical agitation, condenser, and a caustic vent scrubber, was charged 500 milliliters (ml) of methylene chloride and 0.3 milliliters (ml) of a 70 wt % aqueous methyltributylammonium chloride solution. Phosgene flow was started to the reactor at 2 grams per minute (2 g/min). After one minute of phosgene flow, a caustic solution of BPA (33.15 grams of BPA dissolved in 29 grams of 50% NaOH solution and 200 ml of deionized water) was fed to the reactor over 15 minutes. The phosgene flow continued for 2 minutes after the BPA addition was complete. A total of 38 grams of phosgene was fed. Reaction pH was 7 to 8 for most of the reaction but dropped to pH=1 at the end of phosgene addition.

The reaction was purged with nitrogen to sweep unreacted phosgene to a caustic scrubber. The pH was gradually adjusted to pH=6 by dropwise addition of 50 wt % NaOH solution. The reaction was sampled and analyzed by high pressure liquid chromatography (HPLC) using diisobutylamine derivatization to determine the degree of polymerization of the bischloroformate. The degree of polymerization was less than 1.5. Hydroquinone (6.8 grams) and p-cumylphenol (1.78 grams) were added to the reactor as solids and the pH was adjusted 7 to 8. The reaction was stirred until the hydroquinone concentrations in the brine layer were <200 parts per million (ppm), at which time chloroformates were still present. Triethylamine (0.3 ml) was then added and the reaction stirred at pH of 9 until all chloroformates were consumed. Phosgene (6 grams fed at 2 g/min) was then added to ensure complete reaction, while 50 wt % NaOH solutions was added as needed to maintain a pH of 9.

The aqueous and organic phases were separated. The organic phase was removed and washed with 1N HCl (1×500 ml) and deionized water (3×500 ml). The polymer was isolated by hot water precipitation and dried at 110° C. overnight. The resulting polymer had a weight average molecular weight (Mw) of 22,842 daltons, a number average molecular weight (Mn) of 10,777 daltons and a polydispersity index of 2.12 as determined by gel permeation chromatography (GPC). A film pressed from the polymer was clear with no sign of haze by visual inspection.

The percent of hydroquinone-hydroquinone carbonate linkages in the polymer was determined by $^{13}$C NMR. About 200 milligrams of sample was dissolved in about 4 milliliters of a deuterated solvent such as $CDCl_3$. The dissolved sample was placed in an NMR tube and analyzed using a 400 Megahertz Varian Mercury NMR operating at 100.5 Megahertz for carbon with a spectral window of 21.1 kilohertz, an acquisition time of 1 second, and a pulse delay of 2 seconds. Typically 1,000 scans are collected. The three types of carbonate peaks were identified and assigned as follows: 151.5 ppm (hydroquinone-hydroquinone carbonate), 151.75 ppm (hydroquinone-BPA carbonate), and 152.0 ppm (BPA-BPA carbonate). The peak areas were used to calculate the percent of hydroquinone-hydroquinone carbonate linkages as follows:

$$\% \text{ hydroquinone-hydroquinone carbonate linkages} = \frac{\text{peak area at } 151.5}{(\text{peak area at } 151.5 + \text{peak area at } 151.75 + \text{peak area at } 152.0)}$$

Analysis showed that the amount of hydroquinone-hydroquinone carbonate linkages in the polymer was 1.0%.

EXAMPLE 2 (COMPARATIVE)

To a 2-liter (L) flask equipped with mechanical agitation, condenser, and a caustic vent scrubber, was charged 500 ml of methylene chloride and 0.3 ml of a 70 wt % aqueous methyltributylammonium chloride solution. Phosgene flow was started to the reactor at 2 g/min. After one minute of phosgene flow, a caustic solution of BPA (33.15 grams of BPA dissolved in 26 grams of 50% NaOH solution and 175 ml of deionized water) was fed to the reactor over 15 minutes. The phosgene flow continued for 2 minutes after the BPA addition was complete. A total of 38 grams of phosgene was fed. Reaction pH was 7 to 8 for most of the reaction but dropped to pH=1 at the end of phosgene addition.

The reaction was purged with nitrogen to sweep unreacted phosgene to a caustic scrubber. The pH was gradually adjusted to pH=7 by dropwise addition of 50 wt % NaOH solution. The reaction was sampled and analyzed by HPLC using diisobutylamine derivatization to determine the degree of polymerization of the bischloroformate. The degree of polymerization was less than 1.5. Hydroquinone (6.8 grams) and p-cumylphenol (1.74 grams) were added to the reactor as solids and the pH was adjusted 7 to 8. The reaction was stirred at pH of 7 and the pH gradually increased to a pH of 11 to 12, and the hydroquinone concentration in the brine layer was approximately 800 parts per million (ppm), at which time chloroformates were still present. Triethylamine (0.3 ml) was then added and the reaction stirred at pH of 11-12 until all chloroformates were consumed. Phosgene (6 grams fed at 2 g/min) was then added to ensure complete reaction, while 50 wt % NaOH solution was added as needed to maintain a pH of 9.

The aqueous and organic phases were separated. The organic phase was removed and washed with 1N HCL (1×500 ml) and deionized water (3×500 ml). The polymer was isolated by hot water precipitation and dried at 110° C. overnight. The resulting polymer had a weight average molecular weight (Mw) of 27,993 daltons, a number average molecular weight (Mn) of 10,737 daltons and a polydispersity index of 2.6 as determined by gel permeation chromatography. A film pressed from the polymer was hazy by visual inspection. $^{13}$C NMR showed that 8.5% of the carbonate linkages were hydroquinone-hydroquinone carbonate linkages compared to a theoretical value of 9% for a random copolymer.

While the degree of polymerization of the bischloroformate is the same in Example 1 and 2, the reaction of the bischloroformate and hydroquinone was only allowed to proceed until the hydroquinone concentration was 800 ppm in Example 2, leaving a significant amount of hydroquinone in the brine layer. Upon addition of the triethylamine the remaining bischloroformates condensed to make polymer, leaving hydroquinone in the brine layer. The addition of phosgene resulted in the hydroquinone molecules reacting with each other and the polymer increasing the number of hydroquinone-hydroquinone carbonate linkages and diminishing optical clarity.

EXAMPLE 3

To a 75 liter reaction equipped with mechanical agitation, condenser, and caustic scrubber vent system was charged 24 liters methylene chloride, 40 grams of p-cumylphenol (0.19 moles), and 30 ml of a 70 wt % aqueous methyltributylammonium chloride solution (0.09 moles). Phosgene was added to the reactor at 80 g/min for 2 minutes (160 grams, 1.61 moles). The phosgene flow was continued at 80 g/min for an additional 38 minutes (3040 grams, 30.7 moles) while a caustic solution of BPA (2480 grams BPA dissolved in 17.4 liters of deionized water with 1740 grams of 50 wt % NaOH solution) was cofed at 600 g/min to the same reactor. Immediately after the BPA solution was fed a solution of p-cumylphenol (66 g in 2 liters of methylene chloride) was fed to the reactor. Throughout the phosgenation, a 50 wt % NaOH solution was added as necessary to maintain a pH of 4. When phosgenation was complete, the reactor was purged with nitrogen for 10 minutes to remove any residual phosgene and a 50 wt % NaOH solution was added as necessary to raise the reactor contents to pH of 8. Analysis of the bischloroformate showed a degree of polymerization less than 1.5.

Hydroquinone (512 g, 4.64 moles) was stirred in 4 liters of methylene chloride and the slurry transferred to the reactor. P-cumylphenol (66 grams, 0.31 moles) was dissolved in 1 liter of methylene chloride and transferred to the reactor. The transfer line was flush with an additional 1 liter of methylene chloride. The reaction was held a pH of 8.5 until the concentration of hydroquinone in the brine phase had dropped to less than 200 ppm. Triethylamine (40 ml in 1 liter of water) was added and the transfer line was flushed with an additional liter of water. The reactor was stirred at pH of 9 to 10 until no more chloroformates were detected. Another 200 grams of phosgene were added at 50 g/min while the pH was held at 9 to 10 by the addition of 50 wt % NaOH solution.

The reactor contents were then transferred to another tank and centrifuged to remove the brine layer. The organic layer containing polymer was washed with aqueous acid and then with deionized water until residual chloride ion levels were less than 5 ppm. The polymer was isolated by steam precipitation followed by drying under nitrogen. The final dried resin powder has a Mw of 17,457, a Mn of 7,479, a polydispersity index of 2.33, 0.45 ppm triethylamine, 0.15 ppm chloride ion, 0.10 ppm iron, and 64 ppm residual BPA. A film pressed from this resin was clear. $^{13}$C NMR showed the number of hydroquinone-hydroquinone carbonate linkages was 1.5%.

The singular forms "a," "an," and "the" include plural referents unless the context clearly dictates otherwise. The endpoints of all ranges reciting the same property or quantity are independently combinable and inclusive of the recited endpoint. In the chemical formulas, a dash ("-") represents a bond between two atoms, and a dash attached to only one atom has a valence filled by an atom that is not shown. All references are incorporated herein by reference. "Optional" or "optionally" means that the subsequently described event or circumstance may or may not occur, and that the description includes instances where the event occurs and instances where it does not.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A copolycarbonate of the formula

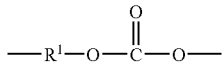

(1)

wherein 5 to 50 mole percent of the total number of $R^1$ groups is derived from a monomer of formula (2)

(2)

wherein each $R^f$ is independently at each occurrence a halogen atom, a hydrocarbon group having 1 to 10 carbons, or a halogen substituted hydrocarbon group having 1 to 10 carbons, and n is 0 to 4; and 50 to 95 mole percent of the $R^1$ groups are derived from a dihydroxy compound of formula (7)

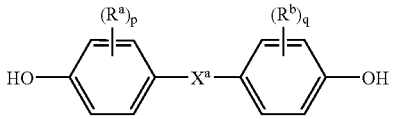

(7)

wherein $R^a$ and $R^b$ are each independently a halogen atom or a monovalent $C_{1-6}$ alkyl group; p and q are each independently integers of 0 to 4; and $X^a$ is one of the following groups:

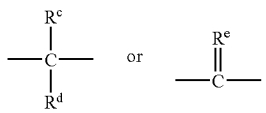

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group; or $R^1$ can be derived from arylene-containing compounds selected from 4,4'-dihydroxybiphenyl, 1,6-dihydroxynaphthalene, and 2,6-dihydroxynaphthalene, and the dihydroxy compound of formula (7) is not a compound of formula (2), and wherein the copolycarbonate comprises at least 10% fewer carbonate linkages of formula (4)

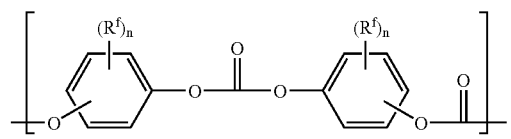

(4)

than would be theoretically obtained in a random copolymer made from the same ratio of the monomer of formula (2) and the dihydroxy compound of formula (7) or the arylene-containing compounds.

2. The copolycarbonate of claim 1, wherein n is zero.

3. The copolycarbonate of claim 1, wherein the monomer of formula (2) is hydroquinone.

4. The copolycarbonate of claim 1, wherein the dihydroxy compound is of the formula (7)

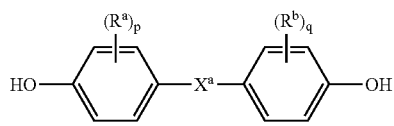

(7)

wherein $R^a$ and $R^b$ are each independently a halogen atom or a monovalent $C_{1-6}$ alkyl group; p and q are each independently integers of 0 to 4; and $X^a$ is one of the following groups:

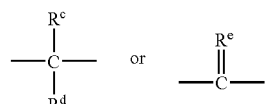

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group.

5. The copolycarbonate of claim 4, wherein each p and q are each zero and $X^a$ is 2,2-propylene.

6. The copolycarbonate of claim 5, wherein n is zero.

7. The copolycarbonate of claim 5, wherein the monomer of formula (2) is hydroquinone.

8. The copolycarbonate of claim 1, wherein 10 to 40 mole % of the $R^1$ groups in the copolycarbonate are derived from a monomer of formula (2), and 60 to 90 mole % of the $R^1$ units are derived from another dihydroxy compound of formula (7) or the arylene-containing compounds.

9. The copolycarbonate of claim 1, comprising 15 to 98% fewer carbonate linkages of formula (4) than would theoretically be obtained in a random copolymer made from the same ratio of the monomer of formula (2) and the dihydroxy compound of formula (7) or the arylene-containing compounds.

10. A method of preparing a copolycarbonate comprising 5 to 50 mole percent of units derived from a monomer of formula (2)

  (2)

wherein each $R^f$ is independently at each occurrence a halogen atom, a hydrocarbon group having 1 to 10 carbons, or a halogen substituted hydrocarbon group having 1 to 10 carbons, and n is 0 to 4, the method comprising forming a bischloroformate from a dihydroxy compound of formula (3)

$$HO—R^5—OH \quad (3)$$

wherein at least 60% of the $R^5$ groups are aromatic, the dihydroxy compound of formula (3) is not a compound of formula (2), and the average number of units in the bischloroformate is 1 to 2, wherein the forming is performed by contacting the dihydroxy compound(s) in a substantially inert, substantially water-immiscible solvent with an aqueous alkali or alkaline earth metal solution and phosgene; and reacting the monomer of formula (2) with the bischloroformate to produce a condensate, in a reaction system comprising water, a substantially inert, substantially water-insoluble organic liquid, base, and a phase transfer agent to form the copolycarbonate.

11. The method of claim 10, further comprising contacting the condensate with an organic base to hydrolyze and condense residual bischloroformates in the condensate.

12. The method of claim 10, wherein n is zero.

13. The method of claim 10, wherein the monomer of formula (2) is hydroquinone.

14. The method of claim 10 wherein the reaction system has a pH of 7 to 10.

15. A copolycarbonate prepared by the method of claim 10.

16. An article comprising the copolycarbonate of claim 1.

17. An article comprising the copolycarbonate manufactured by the method of claim 10.

18. A method of preparing a copolycarbonate comprising 5 to 50 mole percent of units derived from a monomer of formula (2)

  (2)

wherein each $R^f$ is independently at each occurrence a halogen atom, a hydrocarbon group having 1 to 10 carbons, or a halogen substituted hydrocarbon group having 1 to 10 carbons, and n is 0 to 4, the method comprising forming a bischloroformate from a dihydroxy compound of formula (7)

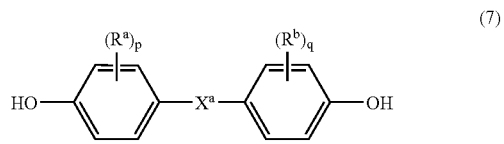  (7)

wherein $R^a$ and $R^b$ are each independently a halogen atom or a monovalent $C_{1-6}$ alkyl group; p and q are each independently integers of 0 to 4; and $X^a$ is one of the following groups:

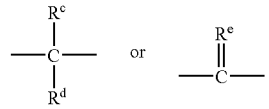

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group; or $R^1$ can be derived from arylene-containing compounds selected from 4,4'-dihydroxybiphenyl, 1,6-dihydroxynaphthalene, and 2,6-dihydroxynaphthalene;

wherein the dihydroxy compound of formula (7) is not a compound of formula (2), and the average number of units in the bischloroformate is less than 19; and reacting the monomer of formula (2) with the bischloroformate, in a reaction system comprising water, a substantially inert, substantially water-insoluble organic liquid, base, and a phase transfer agent to form the copolycarbonate.

19. The method of claim 18, wherein the average number of units in the bischloroformate is 1 to 3.

20. The method of claim 18, wherein the average number of units in the bischloroformate is 1 to 2.

* * * * *